United States Patent [19]

Leir et al.

[11] Patent Number: 5,286,815

[45] Date of Patent: * Feb. 15, 1994

[54] MOISTURE CURABLE POLYSILOXANE RELEASE COATING COMPOSITIONS

[75] Inventors: Charles M. Leir, Falcon Heights; Audrey A. Sherman, St. Paul, both of Minn.; Manisha Sarkar, Austin, Tex.

[73] Assignee: Minnesota Mining and Manufacturing Company, St. Paul, Minn.

[ * ] Notice: The portion of the term of this patent subsequent to May 25, 2010 has been disclaimed.

[21] Appl. No.: 832,270

[22] Filed: Feb. 7, 1992

[51] Int. Cl.$^5$ ............................................. C08G 77/06
[52] U.S. Cl. ................................ 525/477; 528/12; 528/21; 528/34; 528/39; 528/41; 528/33; 524/863
[58] Field of Search ............. 525/477; 528/12, 21, 528/34, 39, 41, 33; 524/863

[56] References Cited

U.S. PATENT DOCUMENTS

| | | | |
|---|---|---|---|
| 4,024,306 | 5/1977 | Takamizawa et al. | 427/387 |
| 4,218,354 | 8/1980 | Hayati et al. | 528/12 |
| 4,269,963 | 5/1981 | Homan et al. | 528/17 |
| 4,313,988 | 2/1982 | Koshar et al. | 428/40 |
| 4,359,369 | 11/1982 | Takamizawa et al. | 204/159.13 |
| 4,525,566 | 6/1985 | Homan et al. | 528/17 |
| 4,530,882 | 0/0000 | Homan et al. | 428/452 |
| 4,554,339 | 11/1985 | Hockemeyer et al. | 528/26 |
| 4,563,539 | 1/1986 | Gornowicz et al. | 556/421 |
| 4,597,987 | 7/1986 | Hockemeyer et al. | 427/54.1 |
| 4,743,474 | 5/1988 | Homan | 427/387 |
| 4,822,687 | 4/1989 | Kessel et al. | 428/447 |

OTHER PUBLICATIONS

"Moisture Curing Silicone Release Coating Technology: A Coating Process is the Missing Component", David J. Huettner, Dow Croning Corp., 1988 Pressure Sensitive Tape Council Technical Seminar.

*Primary Examiner*—John C. Bleutge
*Assistant Examiner*—M. W. Glass
*Attorney, Agent, or Firm*—Gary L. Griswold; Walter N. Kirn; Janice L. Dowdall

[57] ABSTRACT

The present invention relates to a release coating composition comprising (a) about 1 to about 100 percent by weight of a particular polysiloxane polymer (I), (b) about 0 to about 99 percent by weight of a silane of a particular formula (II) or hydrolyzates thereof, and (c) about 1 to about 15 percent by weight of a component selected from the group consisting of acids, anhydrides of acids, ammonium and lower alkyl salts of acids and mixtures thereof wherein the acids each have pKas of less than about 3.

21 Claims, No Drawings

MOISTURE CURABLE POLYSILOXANE RELEASE COATING COMPOSITIONS

FIELD OF THE INVENTION

This invention relates to polysiloxane release coating compositions which cure rapidly and completely in atmospheric moisture in a controllable manner and which have a level of release which can easily be adjusted from premium to tight.

BACKGROUND OF THE INVENTION

In the manufacture of many tape and label products in which a pressure sensitive adhesive is coated on a substrate such as paper or film, an essential component of the construction is the release coating. When a release coating is applied on the non-adhesive side of a backing, as in a roll of tape, it is commonly referred to as a "low adhesion backsize". The low adhesion backsize allows the roll of tape to be unwound with a reasonable amount of force (about 5 to 15 N/dm). On the other hand, a separate release coated sheet which is contacted with an adhesive coated side of a tape or label is referred to as a "liner", and in such a case, the peel force required to remove the tape or label is usually very low—typically less than about 1 to 2 N/dm. For this level of release, which is referred to as premium to easy, the usual coating material employed is some form of cured polysiloxane. These polysiloxanes are, for the most part, polydimethylsiloxanes substituted with a minimum number of various reactive functional groups. These polysiloxanes are coated on a substrate and subsequently chemically crosslinked. Ideally, these polysiloxanes should provide complete coverage of the substrate, cure completely to an ultra thin film (about 1 micron), have reasonable strength, be resistant to abrasion, and strongly adhere to the substrate. Other desirable features of such systems would include long term shelf stability and pot life prior to coating, followed by rapid cure on web, as well as the ability to easily adjust the release to higher levels than premium, if necessary. Few polysiloxane release coatings possess all of these optimal attributes.

Over the years, a number of polysiloxane materials having different curing chemistries were developed as release liner coatings for pressure sensitive adhesives. One of the first to find widespread acceptance was a composition comprising high molecular weight silanol terminal polydimethylsiloxane and a low molecular weight crosslinking copolymer of dimethyl and methyl siloxane. Cure was effected by heating the composition in the presence of organometallic catalysts. Although reliable premium release as provided, the polysiloxane coating suffered from a number of drawbacks; it was useful only on paper, it has to be applied from hydrocarbon solvents, and finally, the cure was extremely slow, often requiring days for completion.

More recently, several other polysiloxanes have become available, in which fast cure is triggered by exposure to ultraviolet radiation (UV). Such compositions and processes are exemplified by U.S. Pat. No. 4,563,539 (Gornowicz et al.); U.S. Pat. No. 4,359,369 (Takamizawa et al.); U.S. Pat. No. 4,554,339 (Hockemeyer et al.); and U.S. Pat. No. 4,597,987 (Hockemeyer et al.). These patents disclose oligomeric polydimethylsiloxanes substituted with pendant acryloxy alkyl groups which undergo rapid crosslinking using ultraviolet light sensitive photoinitiators in an inert atmosphere. In a similar fashion, U.S. Pat. No. 4,313,988 (Koshar et al.) and U.S. Pat. No. 4,822,687 (Kessel et al.) disclose polysiloxane compositions with pendant epoxy alkyl substituents which cure in seconds when super acids are generated from the UV catalyzed decomposition of certain onium salts. For these polysiloxane compositions, inerting of the coating is not necessary. In addition to the high speed of cure, these types of polysiloxane compositions offer the advantage of being completely stable before and during coating operations.

Another curing method which has proven very effective for the preparation of polysiloxane adhesives and sealants is the "moisture cure" of alkoxysilane functional polydiorganosiloxanes. In this system, atmospheric water is utilized to hydrolyze the alkoxy, especially trialkoxy, silane to —SiOH groups, which subsequently condense with other silanols or alkoxysilane groups to form —Si—O—Si—crosslinks. These reactions are catalyzed by certain tin compounds, such as dibutyl tin dilaurate. Although such materials have been reported useful as release coatings, as in, for example, U.S. Pat. No. 4,269,963 (Homan et al.), they, like the condensation cure silicones, are found to cure too slowly to be practical in most manufacturing operations.

Recently, however, Homan et al. (U.S. Pat. Nos. 4,743,474; 4,530,882; and 4,525,566) have disclosed moisture curable silicone compositions consisting of mixtures of predominantly polydiorganosiloxanes having two or more terminal and/or pendant trialkoxysilyl substituents and lesser amounts of tetraalkyl titanate esters which provide silicone release coatings that cure exceptionally rapidly under ambient conditions.

Although these compositions have indeed solved the problem of slow curing of silane substituted silicones, the actual use of such materials in practice is not without some formidable difficulties. These practical processing difficulties are well described by D. J. Huettner in a conference paper entitled "Moisture Curing Silicone Release Coating Technology: A Coating Process is the Missing Component", presented at the 1988 Pressure Sensitive Tape Council Technical Seminar. Huettner states that these silane/titanate mixtures are so extremely sensitive to ambient moisture that they cure instantaneously upon exposure to air, making them almost impossible to coat with ordinary equipment due to premature gelation on the substrate, in the coating equipment, and in the feed tanks.

Due to the limitations of known silicone release coating compositions, a need exists for a silicone release coating composition which has excellent shelf stability, processibility and pot life, and yet which cures rapidly and completely in atmospheric moisture in a controllable manner when coated on a variety of substrates. A need also exists for a release coating composition for which the level of release of the coating can be easily adjusted from premium to tight in a readily predictable and reliable manner. We have found such a release coating composition.

SUMMARY OF THE INVENTION

This invention provides novel polysiloxane release coating compositions which compositions have excellent shelf stability and pot life and which cure rapidly, completely, and reliably in atmospheric moisture in a controllable manner when coated on a variety of substrates. The level of release of release coatings prepared therefrom can be easily adjusted from premium to tight by modifying the polydimethylsiloxane content of the release coating compositions in a readily predictable and reliable manner.

The present invention provides a moisture-curable release coating composition comprising:

(a) about 1 to about 100 percent by weight of polymer selected from the group consisting of polymers of the general Formula:

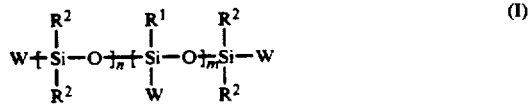
(I)

and mixtures thereof;
wherein
n and m each represent integers, wherein the sum of n plus m is an integer of about 20 to about 5000;
m has a value ranging from about 0 to about $0.1(n+m)$;
$R^1$ are monovalent moieties which can be the same or different selected from the group consisting of alkyl, substituted alkyl, aryl, and substituted aryl;
$R^2$ are monovalent moieties which can be the same or different selected from the group consisting of alkyl, substituted alkyl, aryl, and substituted aryl;
W are monovalent moieties which can be the same or different selected from the group consisting of alkyl, substituted alkyl, aryl, substituted aryl, and reactive hydrolyzable group

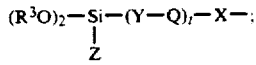

wherein at least about 50% of the total number of silicon atoms excluding those in said reactive hydrolyzable group(s) have two methyl groups bonded thereto, and wherein at least one reactive hydrolyzable group

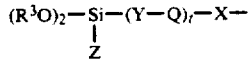

appears on each polymer of Formula I and further wherein at least about 25% of the polymers of Formula I in the release coating composition have at least two reactive hydrolyzable groups

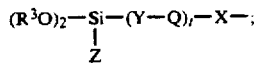

wherein
X are divalent linking groups which can be the same or different selected from the group consisting of alkylene groups comprising about 1 to about 12 carbon atoms;
Q are divalent linking groups which can be the same or different selected from the group consisting of urea, amide, urethane, thiourethane, ether, and thioether groups;
Y are divalent linking groups which can be the same or different selected from the group consisting of alkylene groups comprising about 1 to about 12 carbon atoms;
t is an integer of 0 to 10;
Z are monovalent moieties which can be the same or different selected from the group consisting of —OR and —R wherein R is an alkyl group comprising about 1 to about 3 carbon atoms; and
$R^3$ is a monovalent alkyl group comprising about 1 to about 3 carbon atoms;

(b) about 0 to about 99 percent by weight of a component selected from the group consisting of compounds and polymers of the general Formula:

hydrolysates thereof, and mixtures thereof,
wherein
$R^3$ is as previously defined;
A is a monovalent moiety selected from the group consisting of —$OR^3$, monovalent alkyl groups comprising about 1 to about 20 carbon atoms, and

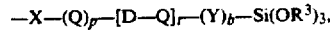

wherein
X, Q, t, Y and $R^3$ are as previously defined;
D is a divalent group which can be the same of different selected from the group consisting of alkylene groups comprising from about 2 to about 30 carbon atoms; aralkylene groups comprising from about 6 to about 30 carbon atoms; arylene groups comprising from about 6 to about 30 carbon atoms; and divalent polymeric segments having a number average molecular weight of about 500 to about 10,000 selected from the group consisting of polyether, polyolefin, polyester, polydiene, and mixtures thereof;
p is an integer of from 0 to 1;
b is an integer of from 0 to 1;
wherein when t is an integer of 1 to 10, b must equal 1 and p must equal 1;
wherein when t=0 and b=0, p must also equal 0;
wherein the weight percentages of (a) and (b) are based upon the total weight of (a) plus (b); and
(c) about 1 to about 15 percent by weight based upon the total weight of (a) plus (b) of a component selected from the group consisting of acids having pKas of less than about 3, anhydrides of acids having pKas of less than about 3, ammonium salts of acids having pKas of less than about 3, lower alkyl ammonium salts of acids having pKas of less than about 3, and mixtures thereof.

Cured versions of the compositions, release coated sheet materials, and methods of providing release coated sheet materials are also provided.

DETAILED DESCRIPTION OF THE INVENTION

Polysiloxane Component

The functional polysiloxanes which comprise component (a) of the invention are represented by Formula I. Examples of preferred polysiloxanes comprise the polysiloxanes selected from the group consisting of polymers of Formula I, wherein $R^1$ and $R^2$ each comprise methyl, X and Y each comprise —$CH_2CH_2CH_2$—, t equals 1, and Q is selected from the group consisting of urea groups and thioether groups. These moieties are preferred because of the commercial availability and ease of preparation of starting materials having these functionalities or their precursors. Preferred polysiloxanes comprise at least one trialkoxysilane terminal or pendant group, wherein Z comprises —OCH$_3$ and R$^3$ comprises —CH$_3$ due to the enhanced hydrolytic activity of the resultant trimethoxysilane terminal and/or pendant groups.

The sum of n plus m must represent an integer of about 20 to about 5000, in order to provide a functional polysiloxane that yields a release coating having the required release force and rheological properties. If the sum of n plus m is much less than about 20, the abhesive properties of a release coating prepared therefrom are diminished due to an insufficient number of dimethylsiloxy groups in the polysiloxane chain. If the sum of n plus m is greater than about 5000, the viscosity of the release coating composition becomes too high for current coating practices and processes. Preferably, the sum of n plus m is an integer of about 70 to about 1000, most preferably about 70 to about 500, a range that balances these release and rheological concerns.

The value of m is less than about 0.1(n+m). Among other factors, the release properties of the release coating of the invention is dependent on the number of dimethylsiloxane segments in the polymer backbone of the polymer of Formula I. Thus, the number of pendant reactive hydrolyzable groups is restricted to ensure an adequate ratio of dimethylsiloxane repeating units in the functional polysiloxanes of Formula I.

Trialkoxysilyl substituted polysiloxanes of Formula I can be conveniently prepared from the reaction of appropriate trialkoxysilyl substituted reagents with various functionally reactive polysiloxanes. Thus, a polymer of Formula I wherein the terminal w groups each comprise a methyl group and wherein the pendant W groups comprise thio-linked, trimethoxysilyl functional reactive hydrolyzable groups, may be obtained from the free radically induced addition of, for example, commercially available mercaptopropyl-substituted polysiloxanes with vinyltrimethoxysilane. In a similar fashion, reaction of isocyanatopropyl triethoxysilane with another commercially available polysiloxane having pendant aminopropyl groups provides polymers of Formula I with dipropylurea links. Difunctional polysiloxanes may be formed by the treatment of bis(aminopropyl) terminated polysiloxanes, which can be obtained from commercial sources or prepared via the method described in copending U.S. patent application Ser. No. 07/671,172, incorporated by reference herein, with isocyanatopropyl triethoxysilane. These reactants produce polysiloxanes of Formula I wherein each terminal W group comprises a urea-functional trialkoxysilane and m=0.

U.S. patent application Ser. No. 07/671,172, issued as U.S. Pat. No. 5,091,483, describes several methods for synthesizing organopolysiloxane diamines useful in the preparation of difunctional polysiloxanes useful in the present invention. In a first method, an organopolysiloxane terminated at both chain ends with hydroxy groups, as represented by the general Formula

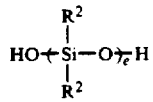
III where R$^2$ is as defined above and e is an integer of a 270 to about 1000, can be subjected to a condensation reaction with a compound represented by the general Formula

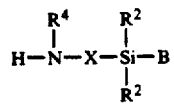
IV where X, and R$^2$ are as defined above, B is a hydroxy group or a hydrolyzable group, and R$^4$ is selected from the group comprising of hydrogen, an alkyl group comprising about 1 to about 10 carbon atoms, aryl, and substituted aryl. A second method involves the reaction of a cyclic organosiloxane, represented by the general Formula

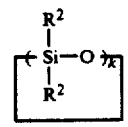
V where R$^2$ is as defined above and k is a positive integer of 3 to 8, with an amine functional endblocker, represented by the general Formula

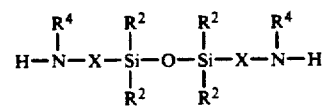
VI where R$^4$, x, and R$^2$ are as defined above, in the presence of a basic catalyst such as tetramethylammonium hydroxide or triorganosilanolate. A third method, a modification of the second, is preferred and involves running the reaction in two stages utilizing a minimum amount of an essentially anhydrous amino alkyl functional silanolate catalyst represented by the general Formula

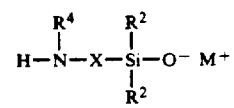
VII where R$^4$, X, and R$^2$ are as defined above and M$^+$ is a cation selected from the group consisting of K$^+$, Na$^+$, and tetraorganoammonium ion, with N(CH$_3$)$_4$$^+$ being preferred. In the first stage of the reaction, a low molecular weight organopolysiloxane diamine, represented by the general formula

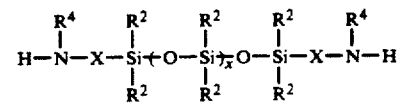
VIII where R$^4$, X, and R$^2$ are as defined above and x is an integer of about 4 to about 40, is prepared by reacting an amine functional disiloxane endblocker represented by Formula VI above with a cyclic organosiloxane represented by Formula V in the presence of a catalytic amount of essentially anhydrous amino alkyl functional silanolate represented by Formula VII in an inert atmosphere such as nitrogen or argon. The preferred catalyst for use in this reaction is 3-aminopropyl dimethyl tetramethylammonium silanolate, which can be obtained as a crystalline solid from the reaction of one molar equivalent of 1,3-bis(3-aminopropyl) tetramethyldisiloxane with two molar equivalents of tetramethylammonium hydroxide pentahydrate in tetrahydrofuran under reflux, followed by drying under vacuum for five hours (0.1 mm) at 60° C. The amount of catalyst employed should be less than about 0.05 percent, preferably about 0.005 to about 0.03 percent, by weight of the resultant organopolysiloxane diamine. The reaction can be carried out in bulk at a temperature of about 80° C. to about 90° C., and under these conditions is usually complete in about 0.5 to about 2 hours, as judged by substantially complete disappearance of the endblocker of the reaction mixture as determined by vapor phase chromatography. The second stage of the reaction involves the slow addition of the remainder of the cyclic organosiloxane required to achieve the desired molecular weight. This addition is preferably carried out dropwise at such a rate that the cyclic organosiloxane is incorporated into the polymer about as fast as it is added, usually in about five to seven hours at the reaction temperature of about 80° C. to about 90° C. By utilizing this two-stage method with a minimum amount of essentially anhydrous catalyst, organopolysiloxane diamines, useful in the preparation of the difunctional polysiloxanes useful in this invention can be consistently prepared having excellent difunctionality with little contamination from monofunctional and nonfunctional polysiloxane impurities.

Finally, for monofunctional polysiloxanes of Formula I in which one terminal W group comprises an alkyl group, m=0, and the other W group comprises dialkyl urea linked triethoxysilane, the starting monoamine is obtained from the well known anionic polymerization of hexamethylcyclotrisiloxane initiated with n-butyl lithium and terminated with the capping reagent, 3-aminopropyl dimethyl fluorosilane, as described in copending U.S patent application Ser. No. 07/671,172, issued as U.S. Pat. No. 5,091,483.

Termination of the anionic polymerization is, in general, achieved via direct reaction of the living polymeric anion with fluorine-containing terminating agents, i.e., functionalized fluorosilones, to produce amine terminated polymeric monomers. The termination reaction is carried out by adding a slight molar excess of the terminating agent (relative to the amount of initiator) to the living polymer at the polymerization temperature.

This preferred capping reagent is prepared by combining 1,3-bis(aminopropyl)tetramethyldisiloxane and a hydrocarbon solvent having a boiling point ranging from about 75° C. to about 85° C. in order to form a solution. Suitable hydrocarbon solvents include cyclohexane, benzene, heptane, and the like. The solution thus formed is reacted by combining the solution with at least about a molar equivalent of an acidic fluoride reactant, preferably at least about a 5 percent molar excess of an acidic fluoride reactant, such as hydrofluoric acid, potassium bifluoride, ammonium fluoride, or the like, preferably ammonium fluoride, with azeotropic removal of water. This provides the amine hydrofluoride substituted fluorosilane isolated as the crystalline hydrofluoride salt precipitate, which can then be converted to the free amine by heating a slurry of the salt in a water-immiscible solvent boiling in the range of about 35° C. to about 50° C., e.g., methylene chloride, with about a 1 percent molar excess to about a 5 percent molar excess of a compound selected from the group consisting of monosubstituted or disubstituted lower alkylamino silanes and hexamethyl disilazane. The amine-substituted fluorosilane can be separated from the solvent by evaporation of the solvent and distillation of the product under reduced pressure.

The release coating composition of the invention comprises about 1 to about 100 percent by weight of polymer of Formula I, preferably about 5 to about 30 percent by weight for use as low adhesion backsizes, and preferably about 50 to about 90 percent by weight for applications requiring easier release, based upon the total weight of components (a) plus (b). As indicated previously, component (a) comprises at least about 25 percent of polysiloxane of Formula I which has at least two reactive, hydrolyzable functional silane groups per polymer. Component (a) can comprise mixtures of difunctional or multifunctional polysiloxanes of Formula I with polysiloxanes of Formula I having only one hydrolyzable, reactive silane group, i.e., typically a terminal hydrolyzable reactive silane group. Mixtures of all three, i.e., monofunctional, difunctional and multifunctional polysiloxanes of Formula I are also possible. The exact composition is dependent on such factors as the requirements of the coating process, the release requirements of the pressure sensitive adhesive employed, and other associated elements encountered in each particular application.

When component (a) comprises monofunctional polysiloxanes of Formula I blended with difunctional polysiloxanes and/or multifunctional polysiloxanes, no more than about 75 percent, preferably no more than about 60 percent of the polymers of Formula I should comprise monofunctional polysiloxanes. Incorporation of increasing amounts of the monofunctional polysiloxanes of Formula I (i.e., having only one reactive trialkoxysilane substituent) in the formulation tends to reduce the surface friction as well as, in many instances, lower the level of release of the cured release coating. Incorporation of an excess of monofunctional polysiloxane, however, may lead to a slow and/or incomplete cure. On the other hand, increasing the number of reactive functional groups in the polysiloxanes of Formula I, or increasing the amount of these multifunctional polysiloxanes in mixtures of monofunctional and difunctional polysiloxanes, tends to have the effect of increasing the rate of cure of the compositions.

NON-POLYSILOXANE CONTAINING COMPONENT

The moisture curable release coating composition of the invention comprises about 0 to about 99 percent by weight of a non-polysiloxane containing component selected from the group consisting of compounds and polymers of Formula II, hydrolysates thereof, and mixtures thereof. If the non-polysiloxane component is included, the release coating composition typically comprises about 1 to about 99 percent by weight non-polysiloxane of component (b) and about 1 to about 99 percent by weight polysiloxane of component (a) based upon the total weight of (a) plus (b). These non-polysiloxane containing components may be used to adjust the viscosity of the composition or to impart additional desirable characteristics to the cured release coatings. For example, inclusion of up to about 50 percent by weight of component (b) based upon the total weight of components (a) plus (b) provides cured coatings which exhibit the same easy level of release as the pure, cured polysiloxane component (a), but with better mechanical strength and adhesion to substrates. To obtain release coatings with higher levels of peel adhesion, compositions having significantly greater amounts of non-polysiloxane component (b), i.e., from about 70 to about 99 percent, preferably about 80 to about 95 percent, based upon the total weight of components (a) and (b) are utilized. Release coating compositions with these higher levels of non-polysiloxane component provide increasing levels of release force in a controlled manner.

Examples of useful non-polysiloxane containing components having terminal alkoxysilyl groups include but are not limited to those selected from the group consisting of alkoxysilyl terminated alkanes, alkoxysilyl terminated ethers, alkoxysilyl terminated thioethers, tetraalkoxy silyl compounds, trialkoxysilyl terminated polymeric derivatives, such as trialkoxysilyl terminated polypropylene oxide, polyethylene oxide, polytetramethylene oxide, polycaprolactone, mixtures thereof, and the like.

During the cure of a composition of the invention which comprises components (a) and (b), wherein (b) is represented by Formula II, in addition to component (c), atmospheric moisture hydrolyzes the silane groups of both the functional polysiloxane(s) of Formula I and the non-polysiloxane component(s) of Formula II to intermediate SiOH groups which ultimately undergo condensation to form Si—O—Si bonds in a random fashion to provide crosslinked silicate networks in which the functional polysiloxanes of Formula I are chemically bonded to the non-polysiloxane components of Formula II. Thus, the corresponding hydrolysates of the silane functional compounds and polymers of Formula II, i.e., silicate resins, colloidal silica, etc., can be used in place of or in addition to the compounds and polymers of Formula II in component (b) of the release coating composition of this invention. If hydrolysates are included, the release coating composition preferably comprises about 1 to about 15 percent by weight of a hydrolysate such as colloidal silica based upon the total weight of components (a) plus (b). Component (b) may optionally also include, in addition to the hydrolysate(s), compounds and/or polymers of Formula II.

CATALYST

The release coating composition of the invention comprises about 1 to about 15 weight percent of component (c) based upon the total weight of components (a) plus (b), wherein component (c) is selected from the group consisting of acids having pKas of less than about 3, anhydrides of acids having pKas of less than about 3, ammonium salts of acids having pKas of less than about 3, lower alkyl ammonium salts of acids having pKas of less than about 3, and mixtures thereof. Lower alkyl ammonium salts of acids having pKas of less than about 3 refer to the products obtained from the neutralization of acids having pKas of less than about 3 with amines having alkyl substituents comprising from about 1 to about 3 carbon atoms. Preferably component (c) comprises an organic acid or a derivative thereof in order to ensure most efficient and effective cure.

In order to facilitate a more rapid cure, the release coating composition preferably comprises about 3 to about 10 of component (c) based upon the total weight of components (a) plus (b). Preferably the acid should have a pKa of about 0.1 to about 1.5 in order to provide a more complete and efficient conversion of the hydrolyzable alkoxysilane groups present in the relese coating composition. If greater than about 15 weight percent of component (c) is included in the release coating composition, no additional benefit is achieved, and the excess acid or acid derivative component becomes a nonincorporated diluent which may actually have a deleterious effect on the performance of the release composition. On the other hand, if insufficient component (c) is included, the hydrolysis of the alkoxysilane functionalities and subsequent condensation to cured silicate networks occurs too slowly.

Examples of useful acids, anhydrides, and lower alkyl ammonium salts thereof falling within component (c) include but are not limited to those selected from the group consisting of trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

Catalyzed by the component (c), the release coating compositions of the invention cure to solid, crosslinked polysiloxane coatings via the hydrolysis of the alkoxysilane endgroups and condensation to silicate networks. When cast in thin films, as is the case for release coatings, the reaction occurs extremely rapidly, typically curing to clear, smear-free, and well anchored coatings in about 60 seconds or less.

METHOD OF FORMING RELEASE-COATED SUBSTRATES

The moisture curable release coating compositions of this invention may be applied to substrates by most standard coating techniques, either as dilute solutions in organic solvents or as neat liquids. When cast from solvent, the component (c) of the composition may be present either as the free acid, as an anhydride, as an ammonium or lower alkyl ammonium salt, such as triethylammonium, or as a mixture thereof. Suitable solvents include but are not limited to volatile organic liquids which will dissolve the compositions of the invention, including but not limited to those solvents selected from the group consisting of alkanes, arenes, chlorinated hydrocarbons, lower alkanols, and mixtures thereof. If a solvent is utilized, the release coating composition may be included in the solvent at a concentration as low as about 2 percent solids. In the free acid form, curing of the functional polysiloxane occurs almost instantaneously upon evaporation of the solvent from the coated substrate. In the ammonium salt and lower alkyl ammonium salt form, however, the catalyst is inactive, and cure does not take place until the dried coating is heated sufficiently to dissociate the salt and evaporate the amine to liberate the free acid catalyst and initiate the moisture cure. The temperatures required for this will vary depending on the particular acid employed, but generally will range from about 50° C. to about 150° C., preferably about 80° C. to about 110° C.

When coating very high solids solutions (i.e., about 80 percent solids or more) or neat materials, it is essential to utilize the ammonium salt form or the lower alkyl ammonium salt form of the acid, or mixtures thereof as component (c). Otherwise, it is not possible to avoid premature reaction with atmospheric moisture and subsequent gellations. With the inactivated ammonium salt, lower alkyl ammonium salt, or mixtures thereof as component (c), it is thus possible to coat the release coating compositions of this invention at 100% solids in atmospheric moisture using standard coating techniques, such as gravure, offset gravure, and electrospray, without premature curing. Standard electrospray coating techniques are described in U.S. Pat. No. 4,748,043, the disclosure of which is incorporated herein by reference. Cure is then activated by heating the coating as described above. The release coating compositions of the invention preferably consist essentially of components (a), (b), and (c) and optional solvent or components (a) and (d) and optional solvent, most preferably the release coating compositions of the invention consist of components (a), (b), and (c) and optional solvent or components (a) and (c) and optional solvent.

The release coating composition of this invention can be used as a coating on a substrate, which can be a sheet, a fiber, or a shaped object. However, the preferred substrates are those used for pressure-sensitive adhesive products. The composition can be applied to at least one major surface of suitable flexible or inflexible backing materials and then cured. Useful flexible backing materials include paper, plastic films such as poly(propylene), poly(ethylene), poly(vinyl chloride), poly(tetrafluoroethylene), polyester [e.g., poly(ethylene terephthalate)], polyamide film such as dupont's Kapton TM, cellulose acetate, and ethyl cellulose, although any surface requiring release toward adhesives can be used. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film, or ceramic sheet material. Primers can be utilized, but they are not always necessary.

The release coating composition of the invention can also be used as a component in an abrasive article. Copending, concurrently filed U.S. patent application Ser. No. 07/832,474, issued as U.S. Pat. No. 5,213,589 on May 25, 1993. describes an abrasive article comprising a substrate having on a surface thereof particles of an abrasive material secured by a binding medium to form an abrasive surface wherein at least a portion of the abrasive surface has thereon a coating comprising a crosslinked siloxane, the crosslinked siloxane comprising the condensation reaction product of the release coating composition of the invention.

In most cases, the release coating composition of this invention provides coatings which possess the desired level of release immediately upon curing. Thus, the composition is suitable for use in the integrated manufacture of PSA-coated labels and tapes. The specific level of release provided upon curing can be controllably varied through variation in the weight percentage and molecular weight of the functional polysiloxane of Formula I included in the composition.

A sufficiently high amount of difunctional and/or multifunctional siloxanes (i.e., siloxanes having two or more reactive hydrolyzable groups) must be present to ensure a high and rapid degree of alkoxysilane hydrolysis conversion and complete cure of the polysiloxane. Thus, release coatings obtained via the moisture cure of the composition of the invention contain little or no free silicone to adversely affect the tack and peel properties of PSAs which come in contact with them. The release coating composition of the invention cures rapidly to firmly anchored, highly crosslinked, solvent resistant, tack-free coatings which have utility for a broad range of PSA types, such as those based on acrylates, tackified natural rubbers, and tackified synthetic elastomers.

EXAMPLES

All parts, percentages, ratios, etc. in the examples and the rest of the specification are by weight unless otherwise specified.

AGED RELEASE VALUE

This test measures the effectiveness of the silicone release composition after a period of heat aging. The aged release value is a quantitative measure of the force required to remove a flexible adhesive tape from a substrate coated with the test composition at a specific angle and rate of removal. In the following examples this force is expressed in Newtons per decimeter (N/dm) from the following representative examples of flexible adhesive tapes:

Tape A—acrylate pressure-sensitive adhesive coated on 1.91 cm wide cellulose acetate backing;

Tape B—tackified styrene-isoprene block copolymer pressure-sensitive adhesive coated on a 1.27 cm wide polypropylene backing;

Tape C—an aggressive acrylate copolymer pressure-sensitive adhesive on a 1.27 cm polypropylene backing; and, Tape D—tackified natural rubber coated on a 1.27 cm wide resin impregnated creped paper backing.

Aged release testing was conducted by laminating a 2.54 cm by 20.32 cm strip of the coated substrate prepared in the examples coated side up to the stage of an Instrumentors, Inc. slip/peel tester (model 3M90) with double coated tape. A 1.9 cm by 15.24 cm strip of a pressure-sensitive adhesive (PSA) coated test tape was rolled down onto the laminate thus formed with a 1.82 kg rubber roller. The force required to remove this tape at 180° and 228.6 cm/minute after allowing the test tape to dwell in contact with the coated substrate for two or three days at 65° C. was then measured. The results of these tests are reported below.

Aged readhesions were also measured by adhering the freshly peeled tape to a clean glass plate and measuring the peel adhesion in normal fashion using the same Instrumentors slip/peel tester indicated above, again peeling at 228.6 cm/min and at a 180° peel angle after allowing the test tape to dwell for two to three days at 65° C. These measurements were taken to determine whether a drop in the adhesion value occurred due to undesirable contamination of the adhesive surface by the release coating. Readhesions are reported as a percentage of the force required to remove the aged sample from a clean glass plate versus the force required to remove a control tape sample from a clean glass plate which has not been adhered to the release coating.

EXAMPLE 1

Preparation of Aminoalkyl Fluorosilane Terminating Agent

A 500 ml, 3 neck round bottom flask was charged with 49.6 g 1,3-bis(3-aminopropyl)tetramethyldisiloxane, 29.6 g ammonium fluoride, and 300 ml cyclohexane. While heating under reflux, water was removed by means of a Dean-Stark trap. After 18 hours, 4.4 ml of water had been collected, and the clear, colorless solution was transferred while warm to a 500 ml 1-neck round bottom flask. The solvent was distilled on a rotary evaporator to provide 165 g of white solid. This was dissolved in 200 ml of methylene chloride. Next, 30 g of hexamethyldisilazane was added and the mixture was stirred and heated under reflux for 5 hours. The flask was fitted for distillation and the solvent removed under aspirator vacuum. The product was distilled (boiling point of 70° C.) at aspirator vacuum to provide 3-aminopropyldimethyl fluorosilane as a clear, colorless oil. The yield was 54 g (100%), which was determined to be pure by vapor phase chromatography. The structure was confirmed by NMR spectroscopy.

EXAMPLE 2

Preparation of Mono-Aminopropyl-Terminated Polydimethylsiloxane

First, n-butyl lithium (10 ml, 2.5M) was added to 7.4 g octamethylcyclotetrasiloxane (D4) under argon to form lithium silanolate initiator. After stirring for 30 minutes, a solution of 250 g hexamethylcyclotrisiloxane (D3) in 250 g dry tetrahydrofuran was added following which the composition was stirred at room temperature for 18 hours. To the resulting viscous syrup of lithium polydimethylsiloxanolate was added 3.4 g of the 3-aminopropyldimethyl fluorosilane terminating agent of Example 1. The viscosity rapidly decreased. After stirring for 2 hours, the solvent was distilled off on a rotary evaporator. The product was filtered to remove lithium fluoride and 250 g of silicone monoamine was provided as a clear, colorless oil. Titration of a sample dissolved in 50/50 isopropyl alcohol/tetrahydrofuran with 0.1N HCl gave a number average molecular weight, Mn, of 9400 (theoretical Mn=10,000). A mono-aminopropyl terminated polydimethylsiloxane, Mn=15000, was also prepared by repeating the above procedure, but increasing the amount of D3 in the reaction to 375 g.

EXAMPLE 3

Preparation of Di-Aminolpropyl Terminated Polydimethylsiloxanes

A 500 ml 3-necked round bottom flask equipped with thermometer, mechanical stirrer, dropping funnel and dry argon inlet was charged with 7.44 g bis(3-aminopropyl) tetramethyldisiloxane and 36 g of octamethylcyclotetrasiloxane (D4) which had been previously purged for 10 minutes with argon. The flask contents were heated to 80° C. with an oil bath, and a trace (about 0.03 to 0.05 g) of anhydrous 3-aminopropyl dimethyl tetramethylammonium silanolate catalyst was added via a spatula. The composition was stirred at 80° C. and after 30 minutes of stirring had become quite viscous. Vapor phase chromatography (VPC) showed that the endblocker had completely disappeared. To the resultant reaction mixture (which consisted of a 1,500 number average molecular weight polysiloxane with aminopropyl endgroups, cyclic siloxanes and active catalyst) was added dropwise over a six hour period 310 g of argonpurged D4, resulting in a further rise in the viscosity. Heating the reaction flask contents at 80° C. was continued overnight. The catalyst was decomposed by heating at 150° C. for ½ hour, and the product was stripped at 140° C. at 0.1 mm pressure until no more volatiles distilled (ca. 1½ hour), resulting in 310 g of a clear, colorless, viscous oil (a yield of 88% of theoretical). The number average molecular weight of the product determined by acid titration was 10,000. Using this procedure, but varying the ratio of endblocker to D4, a silicone diamine with a number average molecular weight of 5,000 was also prepared.

EXAMPLE 4

Preparation of Di-Substituted Urea-Trialkoxysilyl Polysiloxanes

These intermediate trialkoxysilane functional silicones having two groups per chain were prepared from the reaction of the corresponding aminoalkyl substituted silicones with an equivalent stoichiometric amount of isocyanatopropyl triethoxy silane, available from SiLAR Laboratories. Thus, 200 g di-aminopropyl terminated polydimethlsiloxane of 5,000 number average molecular weight of Example 3 was heated in vacuo (15 mm Hg) at 100° C. for 10 minutes. The clear, colorless oil was cooled to room temperature under N$_2$, and 19.76 g isocyanatopropyl triethoxysilane was added with stirring. The mixture was hazy at first, but cleared in 10 minutes and became significantly more viscous. In a similar manner, an analogous disubstituted urea-trialkoxysilyl polysiloxane of 10,000 number average molecular weight was prepared by the reaction or 100 g of the 10,000 number average molecular weight diamine of Example 3 with 19.76 g isocyanatopropyl triethoxysilane.

EXAMPLE 5

Preparation of Mono-Substituted Urea-Trialkoxysilyl Polysiloxanes

In a manner similar to that of Example 4, the analogous monosubstituted polydimethylsiloxanes were produced again by the reaction of i.e., 100 g of 10,000 number average molecular weight silicone propylamine of Example 2 with 2.47 g isocyanatopropyl triethoxysilane and 150 g of 15,000 number average molecular weight silicone propylamine of Example 2 with 2.47 g isocyanatopropyl triethoxysilane.

EXAMPLE 6

Preparation of Multi-Substituted Urea-Trialkoxysilyl Polysiloxanes

In a manner similar to that of Example 4, 100 g of PS 812, a multi-aminopropyl silicone (equivalent weight 1700) commercially available from Huls America, was converted to the urea-triethoxysilyl polysiloxane with 14.53 g of the isocyanatopropyl triethoxysilane.

EXAMPLE 7

Preparation of Multi-Substituted Sulfido-Trialkoxysilyl Polysiloxanes

A mixture of 100 g of PS-849, a trimethylsiloxy terminated polydimethyl co-mercaptopropylmethyl siloxane (~8,000 number average molecular weight) having about 4 mercaptopropyl groups per chain (commercially available from Huls America Inc.), 8.15 g vinyl trimethoxysilane, and 0.57 g azo-bis(isobutyronitrile) initiator were dissolved in 69 ml ethyl acetate. The clear solution was purged with N$_2$ for 5 minutes, and heated at 55° C. for 24 hours. Gas chromatography of a sample revealed complete incorporation of the vinyl compound. Evaporation of the solvent under reduced pressure provided the product as a colorless, mobile oil.

EXAMPLE 8

Preparation of Di-Substituted Trialkoxysilyl Thioethers

A solution of 11.4 g mercaptopropyl trimethoxysilane, 9.03 g vinyl trimethoxysilane, and 0.1 g azo bis-(isobutyronitrile) in 13.0 ml ethyl acetate was purged with nitrogen for 5 minutes and then heated for 24 hours at 55° C. The solution was cooled, the solvent evaporated on a rotary evaporator, and the resulting oil distilled under vacuum. The product was collected and weighed 18.5 g (93% yield). NMR confirmed the structure to be that of the desired trimethoxysilylethyl trimethoxysilylpropyl sulfide.

EXAMPLE 9

Preparation of Alkylene Bis(3-Trialkoxysilylpropyl Thio) Ethers

To a slurry of 1.51 g 60% NaH in mineral oil (previously washed with hexane) in 40 ml dry tetrahydrofuran, was added 7.79 g 95% mercaptopropyl trimethoxysilane in 10 ml THF dropwise at 14° C. to control foaming. After 1 hour at room temperature, 5.88 g 97% 1,12-dibromododecane was added dropwise to the stirred solution. The reaction was allowed to warm to room temperature, and stirred for 18 hours. The resulting cloudy mixture was evaporated to dryness, taken up in heptane, filtered, and re-stripped to give the product as a clear, colorless oil having the expected structure, 1,12-bis (trimethoxysilylpropylthio) dodecane as shown by NMR.

EXAMPLE 10

Preparation of Di-Substituted Trialkoxysilyl Urea-Poly(alkylene oxides)

5 g Jeffamine ™ D-2000, an amine terminated polypropylene oxide of 2,000 molecular weight available from the Texaco Chemical Co., was treated with 1.4 g isocyanatopropyl triethoxysilane and stirred for 25 minutes to give the oligomeric bis(urea-triethoxysilane).

PREPARATION OF MOISTURE-CURABLE POLYSILOXANE RELEASE COATING COMPOSITIONS

EXAMPLE 11

To a solution of 10 g of the disubstituted urea-trialkoxysilyl polysiloxanes of 5,000 molecular weight prepared in Example 4 in 10 ml isopropyl alcohol was added 7.0 g of a 10% solution of trichloroacetic acid in isopropyl alcohol. This was diluted to 10% solids by weight with 30 ml more isopropyl alcohol, and was coated on 2 mil polyester film using a #3 Mayer rod. Immediately upon evaporation of the solvent under ambient conditions, a clear, tack-free coating was obtained. It adhered well to the substrate, and was quite rubbery in texture. The aged release and readhesion was recorded in Table 1.

TABLE 1

| Ex. | Tape Sample | Release (N/dm) 3 Day, 65° C. | Readhesion (%) 3 Day, 65° C. |
|---|---|---|---|
| 11 | Tape C | 5.03 | 105.0% |

EXAMPLES 12-14

Examples 12-14 demonstrate the use of mixtures of the functional polysiloxanes described above to vary the release properties of the coatings of the invention. A formulation consisting of 85% of the di-substituted urea-trialkoxysilyl polysiloxanes of 5,000 number average molecular weight prepared in Example 4, and 15% of a 15,000 number average molecular weight mono-substituted urea-trialkoxysilane of Example 5 was prepared by dissolving the two components in isopropyl alcohol at 5% solids; 7 parts trichloroacetic acid by weight of silicone mixture were added, and the solution was coated on polyester film as described in Example 11. Again the material was cured immediately upon drying, but in this case, the coating was much smoother to the touch than that of Example 11. Example 13 was similarly prepared from 75% of the di-substituted urea-trialkoxysilyl polysiloxane of 5,000 number average molecular weight prepared in Example 4 and 25% of a 15,000 number average molecular weight mono-substituted urea-trialkoxysilane of Example 5. In a similar manner, Example 14 was prepared from equal proportions of the di-substituted and mono-substituted trialkoxysilanes. Samples of these release compositions were coated on polyester film as described in Example 11 and aged release and readhesion data were collected and reported in Table 2.

TABLE 2

| Ex. | Tape Sample | Release (N/dm) 3 Day, 65° C. | Readhesion (%) 3 Day, 65° C. |
|---|---|---|---|
| 12 | Tape C | 5.25 | 91.6% |
| 13 | Tape C | 5.25 | 97.8% |
| 14 | Tape C | 7.66 | 91.2% |

EXAMPLE 15

This example illustrates the ability to change the release properties of the polysiloxane coating through altering the molecular weight of the difunctional alkoxysilyl polysiloxane constituent. A polydimethylsiloxane release coating was prepared in a manner identical to that found in Example 12, except that the 5,000 number average molecular weight di-substituted urea-trialkoxysilane used in Example 12 was replaced by the 10,000 number average molecular weight polysiloxane of Example 4. Aged release and readhesion data were collected for this release coating formulation and reported in Table 3.

TABLE 3

| Ex. | Tape Sample | Release (N/dm) 3 Day, 65° C. | Readhesion (%) 3 Day, 65° C. |
|---|---|---|---|
| 15 | Tape C | 3.06 | 80.0% |

EXAMPLES 16-17

In a further variation, the multifunctional silicones having pendant isocyanato triethoxysilyl substituents, as prepared in Example 6, were incorporated into the release coating formulation. Example 16 consists of 100% of this polysiloxane, prepared in the same manner as Example 11. Example 17, prepared by a similar method, consists of 25% mono-functional compound of 15,000 number average molecular weight of Example 5, 60% 10,000 number average molecular weight di-functional alkoxysilane of Example 4, and 15% of the above mentioned multifunctional silicone. Again, excellent release performance with a variety of pressure sensitive adhesives was observed. Aged release and readhesion data were collected for this release coating formulation and reported in Table 4.

TABLE 4

| Ex. | Tape Sample | Release (N/dm) 3 Day, 65° C. | Readhesion (%) 3 Day, 65° C. |
|---|---|---|---|
| 16 | Tape A | 0.82* | 99.4* |
| 17 | Tape C | 0.18 | 69.9 |

"*" denotes 2 day aged release or readhesion

EXAMPLES 18-19

These examples demonstrate that an alternative strongly acidic compound, in this case cyanoacetic acid, may be substituted for trichloroacetic acid as the catalyst in this release composition. In Example 18, 25% 15,000 number average molecular weight mono-functional compound of Example 5 and 75% 10,000 number average molecular weight difunctional polysiloxane of Example 4 were mixed with 2% trichloroacetic acid as described in Example 11. Example 19 illustrates that the same polysiloxane composition may be effectively cured using 2% cyanoacetic acid acid catalyst. Aged release and readhesion data were collected for this release coating formulation and reported in Table 5.

TABLE 5

| Ex. | Tape Sample | Release (N/dm) 3 Day, 65° C. | Readhesion (%) 3 Day, 65° C. |
|---|---|---|---|
| 18 | Tape C | 0.31 | 95.0 |
| 19 | Tape C | 0.35 | 92.9 |

EXAMPLES 20-21

These examples demonstrate the use of trialkyl ammonium salts of the strongly acidic component to delay the hydrolytic cure of the polysiloxane release compositions of this invention. In Example 20, to a solution of 0.85 g of the difunctional triethoxysilyl-urea terminated silicone of Example 4 (4300 number average molecular weight), and 0.15 g of 15,000 number average molecular weight mono-triethoxysilyl-urea of Example 5 in 9.0 g isopropyl alcohol, was added 0.04 g trichloroacetic acid and 0.02 g triethylamine. A sample was coated on 2 mil polyester film with #6 Mayer rod and the solvent evaporated at room temperature. After 2 hours, the coating remained an uncured, easily smeared oil; however, this, or a freshly coated film cured in less than 30 seconds when heated with a hot air gun. Similar results were obtained in Example 21 with another formulation consisting of 1.0 g 85/15 10,000 number average molecular weight di- and 15,000 number average molecular weight mono-triethoxysilanes, 0.06 g trichloroacetic acid and 0.06 g triethylamine in 19 g isopropyl alcohol, and coated on polyester film using #3 Mayer rod. Again, little or no cure occurred until the films were briefly heated in air. Aged release and readhesion data were collected for this release coating formulation and reported in Table 6.

TABLE 6

| Ex. | Tape Sample | Release (N/dm) 3 Day, 65° C. | Readhesion (%) 3 Day, 65° C. |
|---|---|---|---|
| 20 | Tape C | 3.70* | 95.4* |
| 21 | Tape A | 1.30 | 98.2 |

"*" denotes 2 day aged release or readhesion

As is evident from the above results, many parameters may be easily varied (polysiloxane molecular weights, relative weight ratios of polysiloxane functionalities and structural types, etc.) enabling optimization of properties for particular applications.

EXAMPLES 22-24

These examples introduce a non-polysiloxane containing component to an alkoxysilyl functional polysiloxane to produce release coatings which display premium aged release when brought into contact with several representative adhesive tape samples. In Examples 22-24, the multi-functional polysiloxane of Example 6 (78%), 22% of the bis-trimethoxysilane of Example 8, and 5 parts trichloroacetic acid were combined and coated as in Example 11. Aged peel adhesions from a variety of pressure-sensitive adhesives tape samples was recorded and may be found in Table 7.

TABLE 7

| Ex. | Tape Sample | Release (N/dm) 3 Day, 65° C. | Readhesion (%) 3 Day, 65° C. |
|---|---|---|---|
| 22 | Tape D | 2.00 | 86.7 |
| 23 | Tape A | 0.50 | 101.4 |
| 24 | Tape B | 0.70 | 97.7 |

EXAMPLES 25-28

Example 25 illustrates the use of a combination of mono- and di-functional polysiloxane components with a non-polysiloxane alkoxysilyl compound. A mixture of 2.0 g of bis urea-triethoxysilyl terminal silicone (5000 number average molecular weight) of Example 4, 5.0 g mono-urea-triethoxysilyl silicone (15,000 number average molecular weight) of Example 5, and 3.0 g of tetraethoxysilane was diluted to 10% by weight in isopropyl alcohol to provide a formulation consisting of 20% di-functional polysiloxanes, 50% mono-functional polysiloxanes, and 30% reactive diluent. Trichloroacetic acid, 0.5 g (5%), was added and a sample of the solution was coated on 2 mil polyester film. Evaporation of the solvent provided a clear, tack free cured release coating. Other formulations were prepared in which the concentrations of the components was varied.

Examples 26-29 are prepared in the same manner as Example 25 and demonstrate the effect of altering concentrations of the three components of Example 25. Example 26 contains 40% silicone di-silane, 30% silicone mono-silane, and 30% tetraethoxysilane. Example 27 contains 67% di-, 12% mono-, and 21% tetraethoxysilane. Example 28 has percentages of 75%, 13%, and 12% of these mono-functional, di-functional, and diluent concentrations, respectively. Aged peel adhesions and readhesions were recorded and may be found in Table 8.

TABLE 8

| Ex. | Tape Sample | Release (N/dm) 3 Day, 65° C. | Readhesion (%) 3 Day, 65° C. |
|---|---|---|---|
| 25 | Tape D | 2.08 | 139.3 |
| 26 | Tape D | 1.70 | 98.7 |
| 27 | Tape D | 2.20 | 94.9 |
| 28 | Tape D | 1.94 | 98.2 |

EXAMPLE 29

A mixture of 5.0 g silicone diamine of Example 3 having 4300 number average molecular weight, and 5.0 g of 15,000 number average molecular weight silicone mono-functional compound of Example 2, was dissolved in 90 g isopropyl alcohol and, while stirring, treated with 0.66 g 3-isocyanatopropyl triethoxysilane to form the urea-triethoxysilanes. To this solution was added dropwise with stirring, 5.5 g of Nalco 2326, a 15% aqueous dispersion of colloidal silica stabilized with ammonia, available from Nalco Chemical Co; this amounts to 8% solid silica relative to weight of silicones. Cyanatoacetic acid, 0.5 g (5%), was dissolved in the solution and then coated on polyester film using a #3 Mayer rod; the film was placed in a 93° C. oven for 30 seconds to provide a clear, tack free coating which could not be rubbed off. Aged peel adhesions and readhesions were recorded and may be found in Table 9.

TABLE 9

| Ex. | Tape Sample | Release (N/dm) 3 Day, 65° C. | Readhesion (%) 3 Day, 65° C. |
|---|---|---|---|
| 29 | Tape C | 9.57 | 103.3 |

EXAMPLES 30–33

For these coatings, two formulations were prepared according to the method of Example 25; the first consisted of a mixture of 10% of the 5,000 number average molecular weight bis urea-triethoxysilane of Example 4, 70% bis thioether trimethoxysilane of Example 9, and 20% octyltriethoxysilane (Examples 30 and 32). The second (Examples 31 and 33) had 5% of the di-functional alkoxysilane, 70% of the bis thioether trimethoxy silane, and 20% of the octyltriethoxysilane. Both were treated with 5% trichloroacetic acid and coated in the usual manner at 5% solids in isopropyl alcohol. As can be seen by the aged release and readhesion data recorded in Table 10, decreasing polysiloxane concentration lead to an increase in release when tested against two different pressure-sensitive adhesive tape samples.

TABLE 10

| Ex. | Tape Sample | Release (N/dm) 3 Day, 65° C. | Readhesion (%) 3 Day, 65° C. |
|---|---|---|---|
| 30 | Tape D | 17.97 | 93.6 |
| 31 | Tape D | 19.00 | 95.1 |
| 32 | Tape C | 4.38 | 109.2 |
| 33 | Tape C | 4.60 | 100.4 |

EXAMPLE 34

A mixture of 0.5 g 5K bis urea-triethoxysilane of Example 4, 0.5 g 2K polypropylene oxide bis urea-triethoxysilane of Example 10, and 0.07 g trichloroacetic acid in 9 g isopropyl alcohol was coated on polyester film as described in Example 25. The final coating was smooth and completely clear. Aged peel adhesions and readhesions were recorded and may be found in Table 11.

TABLE 11

| Ex. | Tape Sample | Release (N/dm) 3 Day, 65° C. | Readhesion (%) 3 Day, 65° C. |
|---|---|---|---|
| 34 | Tape D | 8.98 | 91.5 |

While this invention has been described in connection with specific embodiments, it should be understood that it is capable of further modification. The claims herein are intended to cover those variations which one skilled in the art would recognize as the chemical equivalent of what has been described here.

We claim:

1. A release coating composition comprising:
(a) about 1 to about 100 percent by weight of polymer selected from the group consisting of polymers of the general Formula:

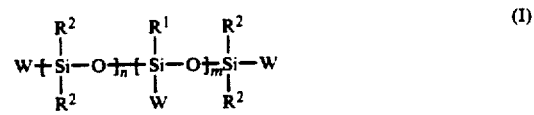

and mixtures thereof: wherein n and m each represent integers, wherein the sum of n plus m is an integer of about 20 to about 5000;

m has a value ranging from about 0 to about 0.1(n+m);

$R^1$ are monovalent moieties which can be the same or different selected from the group consisting of alkyl, substituted alkyl, aryl, and substituted aryl;

$R^2$ are monovalent moieties which can be the same or different selected from the group consisting of alkyl, substituted alkyl, aryl, and substituted aryl;

W are monovalent moieties which can be the same or different selected from the group consisting of alkyl, substituted alkyl, aryl, substituted aryl, and reactive hydrolyzable group

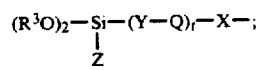

wherein at least about 50% of the total number of silicon atoms excluding those in said reactive hydrolyzable group(s) have two methyl groups bonded thereto, and wherein at least one reactive hydrolyzable group

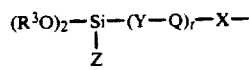

appears on each polymer of Formula I and further wherein at least about 25% of the polymers of Formula I in the release coating composition have at least two reactive hydrolyzable groups

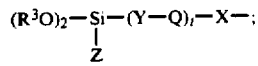

wherein

X are divalent linking groups which can be the same or different selected from the group consisting of alkylene groups comprising about 1 to about 12 carbon atoms;

Q are divalent linking groups which can be the same or different selected from the group consisting of urea, amide, urethane, thiourethane, ether, and thioether groups;

Y are divalent linking groups which can be the same or different selected from the group consisting of alkylene groups comprising about 1 to about 12 carbon atoms;

t is an integer of 0 to 10;

Z are monovalent moieties which can be the same or different selected from the group consisting of —OR and —R wherein R is an alkyl group comprising about 1 to about 3 carbon atoms; and R³ is a monovalent alkyl group comprising about 1 to about 3 carbon atoms;

(b) about 0 to about 99 percent by weight of a component selected from the group consisting of compounds and polymers of the general Formula:

$$(R^3O)_3-Si-A \qquad (ii)$$

hydrolysates thereof, and mixtures thereof, wherein

R³ is as previously defined;

A is a monovalent moiety selected from the group consisting of —OR³, monovalent alkyl groups comprising about 1 to about 20 carbon atoms, and —X—(Q)$_p$—[D—Q]$_t$—(Y)$_b$—Si(OR³)$_3$, wherein X, Q, t, Y and R³ are as previously defined;

D is a divalent group which can be the same or different selected from the group consisting of alkylene groups comprising from about 2 to about 30 carbon atoms; aralkylene groups comprising from about 6 to about 30 carbon atoms; arylene groups comprising from about 6 to about 30 carbon atoms; and divalent polymeric segments having a number average molecular weight of about 500 to about 10,000 selected from the group consisting of polyether, polyolefin, polyester, polydiene, and mixtures thereof;

p is an integer of from 0 to 1;

b is an integer of from 0 to 1;

wherein when t is an integer of 1 to 10, b must equal 1 and p must equal 1;

wherein when t=0 and b=0, p must also equal 0;

wherein the weight percentages of (a) and (b) are based upon the total weight of (a) plus (b); and (c) about 1 to about 15 percent by weight based upon the total weight of (a) plus (b) of a component selected from the group consisting of acids having pKas of less than about 3, anhydrides of acids having pKas of less than about 3, ammonium salts of acids having pKas of less than about 3, lower alkyl ammonium salts of acids having pKas of less than about 3, and mixtures thereof.

2. The release coating composition of claim 1 wherein R¹ and R² each comprise methyl groups, X and Y each comprise —CH₂CH₂CH₂—, t equals 1, and Q is independently selected from the group consisting of urea and thioether groups.

3. The release coating composition of claim 1 wherein the sum of n plus m is an integer of about 70 to about 1000.

4. The release coating composition of claim 1 wherein the sum of n plus m is an integer of about 70 to about 500.

5. The release coating composition of claim 1 wherein the release coating composition comprises about 3 to about 10 percent by weight of component (c) based on the total weight of (a) plus (b).

6. The release coating composition of claim 1 wherein each Z moiety comprises —OCH₃ and each R³ group comprises —CH₃.

7. The release coating composition of claim 1 wherein the release coating composition comprises from about 5 to about 30 percent by weight of polymer of Formula I, based on the total weight of (a) plus (b).

8. The release coating composition of claim 1 wherein the release coating composition comprises from about 50 to about 90 percent by weight of polymer of Formula I, based on the total weight of (a) plus (b).

9. The release coating composition of claim 1 wherein the component of Formula II is selected from the group consisting of alkoxysilyl terminated polypropylene oxide, alkoxysilyl terminated polyethylene oxide, alkoxysilyl terminated polycaprolactone, alkoxy silyl terminated polytetramethylene oxide, alkoxysilyl terminated alkanes, alkoxysilane terminated ethers, alkoxy terminated thioethers, tetraalkoxy silyl compounds, and mixtures thereof.

10. The release coating composition of claim 1 wherein component (b) comprises about 1 to about 15 percent by weight of colloidal silica based upon the total weight of (a) plus (b).

11. The release coating composition of claim 1 wherein the component of element (c) is selected from the group consisting of trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

12. A release coating composition comprising:

(a) about 1 to about 100 percent by weight of polymer selected from the group consisting of polymers of the general Formula:

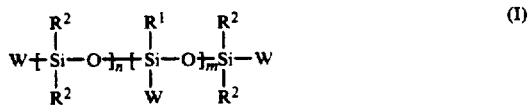

and mixtures thereof: wherein n and m each represent integers, wherein the sum of n plus m is an integer of about 70 to about 1000;

m has a value ranging from about 0 to about 0.1(n+m)

R¹ are monovalent moieties which can be the same or different selected from the group consisting of alkyl, substituted alkyl, aryl, and substituted aryl;

R² are monovalent moieties which can be the same or different selected from the group consisting of alkyl, substituted alkyl, aryl, and substituted aryl;

W are monovalent moieties which can be the same or different selected from the group consisting of alkyl, substituted alkyl, aryl, substituted aryl, and reactive hydrolyzable group

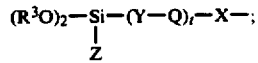

wherein at least about 50% of the total number of silicon atoms excluding those in said reactive hydrolyzable group(s) have two methyl groups bonded thereto, and wherein at least one reactive hydrolyzable group

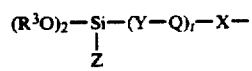

appears on each polymer of Formula I and further wherein at least about 25% of the polymers of Formula I in the release coating composition have at least two reactive hydrolyzable groups

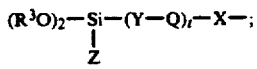

wherein
- X are divalent linking groups which can be the same or different selected from the group consisting of alkylene groups comprising about 1 to about 12 carbon atoms;
- Q are divalent linking groups which can be the same or different selected from the group consisting of urea, amide, urethane, thiourethane, ether, and thioether groups;
- Y are divalent linking groups which can be the same or different selected from the group consisting of alkylene groups comprising about 1 to about 12 carbon atoms;
- t is an integer of 0 to 10;
- Z are monovalent moieties which can be the same or different selected from the group consisting of —OR and —R wherein R is an alkyl group comprising about 1 to about 3 carbon atoms; and
- $R^3$ is a monovalent alkyl group comprising about 1 to about 3 carbon atoms;

(b) about 0 to about 99 percent by weight of a component selected from the group consisting of compounds and polymers of the general Formula:

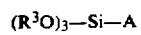 (II)

hydrolysates thereof, and mixtures thereof, wherein
- $R^3$ is as previously defined;
- A is a monovalent moiety selected from the group consisting of —$OR^3$, monovalent alkyl groups comprising about 1 to about 20 carbon atoms, and —X—(Q)$_p$—[D—Q]$_r$—(Y)$_b$—Si(OR$^3$)$_3$ wherein
- X, Q, t, Y and $R^3$ are as previously defined;
- D is a divalent group which can be the same or different selected from the group consisting of alkylene groups comprising from about 2 to about 30 carbon atoms; aralkylene groups comprising from about 6 to about 30 carbon atoms; arylene groups comprising from about 6 to about 30 carbon atoms; and divalent polymeric segments having a number average molecular weight of about 500 to about 10,000 selected from the group consisting of polyether, polyolefin, polyester, polydiene, and mixtures thereof;
- p is an integer of from 0 to 1;
- b is an integer of from 0 to 1;
- wherein when t is an integer of 1 to 10, b must equal 1 and p must equal 1;
- wherein when t=0 and b=0, p must also equal 0;
- wherein the weight percentages of (a) and (b) are based upon the total weight of (a) plus (b); and (c) about 3 to about 10 percent by weight based upon the total weight of (a) plus (b) of a component selected from the group consisting of acids having pKas of less than about 3, anhydrides of acids having pKas of less than about 3, ammonium salts of acids having pKas of less than about 3, lower alkyl ammonium salts of acids having pKas of less than about 3, and mixtures thereof.

13. A release coating composition comprising:

(a) about 1 to about 99 percent by weight of polymer selected from the group consisting of polymers of the general Formula:

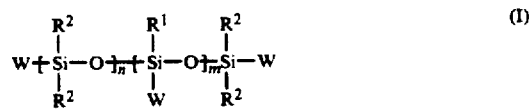 (I)

and mixtures thereof: wherein
- n and m each represent integers, wherein the sum of n plus m is an integer of about 70 to about 500;
- m has a value ranging from about 0 to about 0.1(n+m);
- $R^1$ are monovalent moieties which can be the same or different selected from the group consisting of alkyl, substituted alkyl, aryl, and substituted aryl;
- $R^2$ are monovalent moieties which can be the same or different selected from the group consisting of alkyl, substituted alkyl, aryl, and substituted aryl;
- W are monovalent moieties which can be the same or different selected from the group consisting of alkyl, substituted alkyl, aryl, substituted aryl, and reactive hydrolyzable group

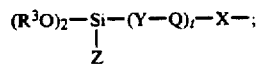

wherein at least about 50% of the total number of silicon atoms excluding those in said reactive hydrolyzable group(s) have two methyl groups bonded thereto, and wherein at least one reactive hydrolyzable group

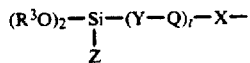

appears on each polymer of Formula I and further wherein at least about 25% of the polymers of Formula I in the release coating composition have at least two reactive hydrolyzable groups

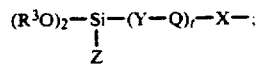

wherein
- X are divalent linking groups which can be the same or different selected from the group consisting of alkylene groups comprising about 1 to about 12 carbon atoms;
- Q are divalent linking groups which can be the same or different selected from the group consisting of urea, amide, urethane, thiourethane, ether, and thioether groups;
- Y are divalent linking groups which can be the same or different selected from the group consisting of alkylene groups comprising about 1 to about 12 carbon atoms;
- t is an integer of 0 to 10;
- Z are monovalent moieties which can be the same or different selected from the group consisting of —OR and —R wherein R is an alkyl group comprising about 1 to about 3 carbon atoms; and
- $R^3$ is a monovalent alkyl group comprising about 1 to about 3 carbon atoms;

(b) about 1 to about 99 percent by weight of a component selected from the group consisting of compounds and polymers of the general Formula:

$$(R^3O)_3-Si-A \qquad (II)$$

hydrolysates thereof, and mixtures thereof, wherein $R^3$ is as previously defined;

A is a monovalent moiety selected from the group consisting of $-OR^3$, monovalent alkyl groups comprising about 1 to about 20 carbon atoms, and $-X-(Q)_p-[D-Q]_t-(Y)_b-Si(OR^3)_3$, wherein X, Q, t, Y and $R^3$ are as previously defined;

D is a divalent group which can be the same or different selected from the group consisting of alkylene groups comprising from about 2 to about 30 carbon atoms; aralkylene groups comprising from about 6 to about 30 carbon atoms; arylene groups comprising from about 6 to about 30 carbon atoms; divalent polymeric segments having a number average molecular weight of about 500 to about 10,000 selected from the group consisting of polyether, polyolefin, polyester, polydiene, and mixtures thereof;

p is an integer of from 0 to 1;

b is an integer of from 0 to 1;

wherein when t is an integer of 1 to 10, b must equal 1 and p must equal 1;

wherein when t=0 and b=0, p must also equal 0;

wherein the weight percentages of (a) and (b) are based upon the total weight of (a) plus (b); and (c) about 3 to about 10 percent by weight based upon the total weight of (a) plus (b) of a component selected from the group consisting of acids having pKas of about 0.1 to about 1.5, anhydrides of acids having pKas of about 0.1 to about 1.5, ammonium salts of acids having pKas of about 0.1 to about 1.5, lower alkyl ammonium salts of acids having pKas of about 0.1 to about 1.5, and mixtures thereof.

14. A release coating formed from curing the composition of claim 1.

15. A release coating formed from curing the release coating composition of claim 12.

16. A release coating formed from curing the release coating composition of claim 13.

17. A substrate coated with the release coating of claim 14.

18. A substrate coated with the release coating of claim 15.

19. A substrate coated with the release coating of claim 16.

20. A method of forming a release coating coated substrate comprising the steps of:

(a) applying to a substrate a layer of a release coating composition, wherein said release coating composition comprises:

(i) about 1 to about 100 percent by weight of polymer selected from the group consisting of polymers of the general Formula:

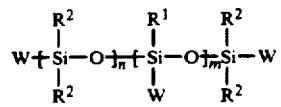

(I)

and mixtures thereof: wherein n and m each represent integers, wherein the sum of n plus m is an integer of about 20 to about 5000;

m has a value ranging from about 0 to about 0.1(n+m);

$R^1$ are monovalent moieties which can be the same or different selected from the group consisting of alkyl, substituted alkyl, aryl, and substituted aryl;

$R^2$ are monovalent moieties which can be the same or different selected from the group consisting of alkyl, substituted alkyl, aryl, and substituted aryl;

W are monovalent moieties which can be the same or different selected from the group consisting of alkyl, substituted alkyl, aryl, substituted aryl, and reactive hydrolyzable group

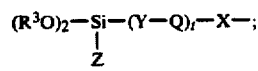

wherein at least about 50% of the total number of silicon atoms excluding those in said reactive hydrolyzable group(s) have two methyl groups bonded thereto, and wherein at least one reactive hydrolyzable group

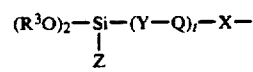

appears on each polymer of Formula I and further wherein at least about 25% of the polymers of Formula I in the release coating composition have at least two reactive hydrolyzable groups

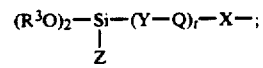

wherein

X are divalent linking groups which can be the same or different selected from the group consisting of alkylene groups comprising about 1 to about 12 carbon atoms;

Q are divalent linking groups which can be the same or different selected from the group consisting of urea, amide, urethane, thiourethane, ether, and thioether groups;

Y are divalent linking groups which can be the same or different selected from the group consisting of alkylene groups comprising about 1 to about 12 carbon atoms;

t is an integer of 0 to 10;

Z are monovalent moieties which can be the same or different selected from the group consisting of $-OR$ and $-R$ wherein R is an alkyl group comprising about 1 to about 3 carbon atoms; and $R^3$ is a monovalent alkyl group comprising about 1 to about 3 carbon atoms;

(ii) about 0 to about 99 percent by weight of a component selected from the group consisting of compounds and polymers of the general Formula:

$(R^3O)_3—Si—A$           (II)

hydrolysates thereof, and mixtures thereof, wherein $R^3$ is as previously defined;

A is a monovalent moiety selected from the group consisting of —$OR^3$, monovalent alkyl groups comprising about 1 to about 20 carbon atoms, and —X—(Q)$_p$—[D—Q]$_t$—(Y)$_b$—Si(OR$^3$)$_3$ wherein X, Q, t, Y and $R^3$ are as previously defined;

D is a divalent group which can be the same or different selected from the group consisting of alkylene groups comprising from about 2 to about 30 carbon atoms; aralkylene groups comprising from about 6 to about 30 carbon atoms; arylene groups comprising from about 6 to about 30 carbon atoms; and divalent polymeric segments having a number average molecular weight of about 500 to about 10,000 selected from the group consisting of polyether, polyolefin, polyester, polydiene, and mixtures thereof;

p is an integer of from 0 to 1;

b is an integer of from 0 to 1;

wherein when t is an integer of 1 to 10, b must equal 1 and p must equal 1;

wherein when t=0 and b=0, p must also equal 0;

wherein the weight percentages of (i) and (ii) are based upon the total weight of (i) plus (ii); and (iii) about 1 to about 15 percent by weight based upon the total weight of (i) plus (ii) of a component selected from the group consisting of ammonium salts of acids having pKas of less than about 3, lower alkyl ammonium salts of acids having pKas of less than about 3, and mixtures thereof;

(b) heating said release coating composition sufficiently to dissociate the component selected from the group consisting of ammonium salts of acids having pKas of less than about 3, lower alkyl ammonium salts of acids having pKas of less than about 3, and mixtures thereof, in order to evaporate ammonia, amine(s), or both, and yield acid(s) having pKas of less than 3; and, (c) exposing said release coating composition to atmospheric moisture sufficient to cure said reactive hydrolyzable groups to form Si—O—Si crosslinks.

21. A method of forming a release coating coated substrate comprising the steps of:

(a) applying to a substrate a layer of a release coating composition, wherein said release coating composition comprises:

(i) about 1 to about 100 percent by weight of polymer selected from the group consisting of polymers of the general Formula:

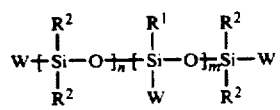
          (I)

and mixtures thereof: wherein n and m each represent integers, wherein the sum of n plus m is an integer of about 20 to about 5000;

m has a value ranging from about 0 to about 0.1(n+m);

$R^1$ are monovalent moieties which can be the same or different selected from the group consisting of alkyl, substituted alkyl, aryl, and substituted aryl;

$R^2$ are monovalent moieties which can be the same or different selected from the group consisting of alkyl, substituted alkyl, aryl, and substituted aryl;

W are monovalent moieties which can be the same or different selected from the group consisting of alkyl, substituted alkyl, aryl, substituted aryl, and reactive hydrolyzable group

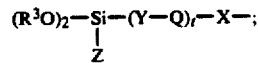

wherein at least about 50% of the total number of silicon atoms excluding those in said reactive hydrolyzable group(s) have two methyl groups bonded thereto, and wherein at least one reactive hydrolyzable group

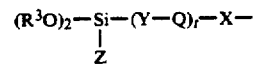

appears on each polymer of Formula I and further wherein at least about 25% of the polymers of Formula I in the release coating composition have at least two reactive hydrolyzable groups

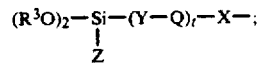

wherein

X are divalent linking groups which can be the same or different selected from the group consisting of alkylene groups comprising about 1 to about 12 carbon atoms;

Q are divalent linking groups which can be the same or different selected from the group consisting of urea, amide, urethane, thiourethane, ether, and thioether groups;

Y are divalent linking groups which can be the same or different selected from the group consisting of alkylene groups comprising about 1 to about 12 carbon atoms;

t is an integer of 0 to 10;

Z are monovalent moieties which can be the same or different selected from the group consisting of —OR and —R wherein R is an alkyl group comprising about 1 to about 3 carbon atoms; and $R^3$ is a monovalent alkyl group comprising about 1 to about 3 carbon atoms;

(ii) about 0 to about 99 percent by weight of a component selected from the group consisting of compounds and polymers of the general Formula:

$(R^3O)_3—Si—A$           (II)

hydrolysates thereof, and mixtures thereof, wherein $R^3$ is as previously defined;

A is a monovalent moiety selected from the group consisting of $-OR^3$, monovalent alkyl groups comprising about 1 to about 20 carbon atoms, and $-X-(Q)_p-[D-Q]_t-(Y)_b-Si(OR^3)_3$ wherein X, Q, t, Y and $R^3$ are as previously defined;

D is a divalent group which can be the same or different selected from the group consisting of alkylene groups comprising from about 2 to about 30 carbon atoms; aralkylene groups comprising from about 6 to about 30 carbon atoms; arylene groups comprising from about 6 to about 30 carbon atoms; and divalent polymeric segments having a number average molecular weight of about 500 to about 10,000 selected from the group consisting of polyether, polyolefin, polyester, polydiene, and mixtures thereof;

p is an integer of from 0 to 1;

b is an integer of from 0 to 1;

wherein when t is an integer of 1 to 10, b must equal 1 and p must equal 1;

wherein when t=0 and b=0, p must also equal 0;

wherein the weight percentages of (i) and (ii) are based upon the total weight of (i) plus (ii); and (iii) about 1 to about 15 percent by weight based upon the total weight of (i) plus (ii) of a component selected from the group consisting of acids having pKas of less than about 3, anhydrides of acids having pKas of less than about 3, and mixtures thereof; and (b) exposing said relese coating composition to atmospheric moisture sufficient to cure said reactive hydrolyzable groups to form Si—O—Si crosslinks.

* * * * *

UNITED STATES PATENT AND TRADEMARK OFFICE
CERTIFICATE OF CORRECTION

PATENT NO. : 5,286,815

DATED : February 15, 1994

INVENTOR(S) : Charles M. Leir, Audrey A. Sherman, and Manisha Sarkar

It is certified that error appears in the above-indentified patent and that said Letters Patent is hereby corrected as shown below:

Column 1, line 53 "release as provided" should read
--release was provided--.

Column 1, line 55 "it has to be" should read
--it had to be--.

Column 4, line 26 "same of different" should read
--same or different--.

Column 4, line 63 "$R^1$ and $R^2$each" should read
--$R^1$ and $R^2$ each--.

Column 5, line 33 "terminal w groups" should read
--terminal W groups--.

Column 5, line 67 "of a 270" should read
--of about 270--.

Column 6, line 33 "$R^4$, x, and $R^2$" should read
--$R^4$, X, and $R^2$--.

Signed and Sealed this

Twenty-eight Day of February, 1995

Attest:

BRUCE LEHMAN

*Attesting Officer*    *Commissioner of Patents and Trademarks*